US012606414B2

(12) United States Patent
Hosemann et al.

(10) Patent No.: US 12,606,414 B2
(45) Date of Patent: Apr. 21, 2026

(54) CONTROL SYSTEM ASSEMBLY FOR MRL-ELEVATOR

(71) Applicant: Inventio AG, Hergiswil (CH)

(72) Inventors: Axel Hosemann, Auw (CH); Christian Studer, Kriens (CH); Donato Carparelli, Lugano (CH); Erich Butler, Ebikon (CH); Patrick Isenegger, Meggen (CH)

(73) Assignee: INVENTIO AG, Hergiswil (CH)

( * ) Notice: Subject to any disclaimer, the term of this patent is extended or adjusted under 35 U.S.C. 154(b) by 1423 days.

(21) Appl. No.: 17/250,914

(22) PCT Filed: Sep. 12, 2019

(86) PCT No.: PCT/EP2019/074392
§ 371 (c)(1),
(2) Date: Mar. 26, 2021

(87) PCT Pub. No.: WO2020/064357
PCT Pub. Date: Apr. 2, 2020

(65) Prior Publication Data

US 2022/0024716 A1 Jan. 27, 2022

(30) Foreign Application Priority Data

Sep. 28, 2018 (EP) .................................... 18197605

(51) Int. Cl.

| | |
|---|---|
| ***B66B 1/34*** | (2006.01) |
| ***B66B 5/00*** | (2006.01) |
| ***B66B 11/00*** | (2006.01) |

(52) U.S. Cl.
CPC .......... *B66B 1/3423* (2013.01); *B66B 1/3446* (2013.01); *B66B 5/0031* (2013.01); *B66B 11/002* (2013.01)

(58) Field of Classification Search
CPC ... B66B 1/3423; B66B 1/3446; B66B 5/0031; B66B 11/002
See application file for complete search history.

(56) References Cited

U.S. PATENT DOCUMENTS

| | | | | |
|---|---|---|---|---|
| 5,142,107 | A * | 8/1992 | Nagatai Yasuhiro | B66B 1/343 187/247 |
| 2014/0224591 | A1* | 8/2014 | Garcia | B66B 1/3415 187/251 |
| 2018/0244496 | A1* | 8/2018 | Walker | B66B 3/002 |

FOREIGN PATENT DOCUMENTS

| | | | |
|---|---|---|---|
| CN | 1546360 | A | 11/2004 |
| CN | 102256886 | A | 11/2011 |

(Continued)

*Primary Examiner* — Jeffrey Donels
(74) *Attorney, Agent, or Firm* — Shumaker, Loop & Kendrick, LLP

(57) ABSTRACT

A control system for an elevator is separated into a first assembly allocated outside and a second assembly allocated inside an elevator shaft. The first assembly includes a power switch for turning on/off the control system, a light switch for switching a light inside the shaft, a safety unit for protecting electrical safety of the control system, a communication unit for data communication with the elevator and/or an external communication device, and a bypass device for bypassing a safety chain of the elevator. The second assembly includes a power supply system for driving the elevator and/or for the safety chain, a monitoring system for monitoring the safety chain, a drive control unit for a drive motor, and a processor for data processing of the control system. The first assembly and the second assembly can communicate with each other and be connected respectively as segments into the safety chain.

16 Claims, 3 Drawing Sheets

2 MRL-ELEVATOR 17a FIXED USER INTERFACE 17b MOBILE USER INTERFACE
20 CAR 21 PUBLIC NETWORK 23a, 23b INSPECTION CONTROL DEVICES
24 GATEWAY INTERFACE
A1 FIRST ASSEMBLY A2 SECOND ASSEMBLY

(56) References Cited

FOREIGN PATENT DOCUMENTS

| | | | | |
|---|---|---|---|---|
| CN | 104176573 | A | 12/2014 | |
| CN | 206142571 | U | 5/2017 | |
| EP | 3000760 | A1 | 3/2016 | |
| JP | H1121036 | A | 1/1999 | |
| WO | 0128910 | A1 | 4/2001 | |
| WO | 2008117368 | A1 | 10/2008 | |
| WO | 2009075672 | A1 | 6/2009 | |
| WO | WO-2017042306 | A1 * | 3/2017 | ........... B66B 1/3407 |

* cited by examiner

3 POWER SWITCH 4 LIGHT SWITCH 6 SAFETY UNIT 7 BYPASS DEVICE
8 POWER SUPPLY SYSTEM 8a BATTERY 10 MONITORING SYSTEM
11 DRIVE CONTROL UNIT 11a VARIABLE-FREQUENCY DRIVE UNIT
12 PROCESSOR 13 COMMUNICATION UNIT 18 EMERGENCY EQUIPMENT
21 PUBLIC NETWORK

2 MRL-ELEVATOR 17a FIXED USER INTERFACE 17b MOBILE USER INTERFACE
20 CAR 21 PUBLIC NETWORK 23a, 23b INSPECTION CONTROL DEVICES
24 GATEWAY INTERFACE
A1 FIRST ASSEMBLY A2 SECOND ASSEMBLY

CONTROL SYSTEM ASSEMBLY FOR MRL-ELEVATOR

FIELD

The invention relates to an elevator control system and an elevator or a group of elevators with such a control system.

BACKGROUND

An elevator may comprise an elevator car that is movable vertically in an elevator shaft (hoistway) and may stop at different floors of a building. An electric motor drives to rotate a traction sheave to cause movement of a belt or roping arrangement, from which the elevator car is suspended. In addition, there is an elevator control system or a so-called main controller which is responsible for coordinating all aspects of elevator service such as travel, speed, and accelerating, decelerating, door opening speed and delay, leveling and hall lantern signals. The control system consists generally of at least a processor, an operating device, a power supply, communication devices, switches and other electric or electronic components.

In order to place the electric motor and the equipment of the control system, in the past an elevator typically had a machine room located usually on a rooftop penthouse of a building. At present, the components of the control system are getting smaller and smaller so that more and more elevators don't need machine rooms anymore and can be constructed as machine-room-less (MRL) elevators. Such a design eliminates the need of a fixed room and thus saves much architectural space. While the motor can be installed on the shaft side wall, the main controller is to be placed where—on one side its components were accessible for the maintenance personnel and on the other side, not too far away from the motor so that to minimize the length of the power cables. Thus, the controller is usually installed on the top floor next to the landing doors. This controller can be locked within a cabinet which should be unlocked using a key for maintenance, repair or emergency purposes etc. The cabinet is normally called as a control cabinet or controller cabinet.

WO2009075672 A1 describes an integration of elevator motor and drive to reduce the amount of wiring required between the drive and the motor for power and control signals. A drive that provides power and control signals to the motor is supported adjacent to the motor case.

SUMMARY

Therefore, the invention of the present patent application aims to provide an elevator control system whose components will be separated and disposed as much as possible and at the same time whose functions at least will be kept as much as possible, in order to increase the degree of integration of the components assembly while reducing the incidence of failures and the total costs of the control system.

Such an object may be achieved by the subject-matter of the exemplary embodiments in the following description.

According to the present invention, a control system for an elevator can be separated or split in a first assembly for allocating outside and a second assembly for allocating inside of a shaft of the elevator. The first assembly comprises a power switch for turning on or off the control system, a light switch for switching a light inside of a shaft of the elevator, a safety unit being capable of protecting electrical safety of the control system, a communication unit for data communicating with the elevator and/or an external communication means (e.g. device or network), and a bypass device for bypassing a safety chain of the elevator. The second assembly comprises a power supply system for driving the elevator and/or for the safety chain, a monitoring system for monitoring the safety chain, a drive control unit for a drive motor of the elevator, and a processor for data processing of the control system. The first assembly and the second assembly can communicate (e.g. by ethernet or bus system) with each other and be connected respectively as segments into the safety chain.

A safety chain is a safety element consisting of a set of safety-related components arranged in series to prevent an elevator from being able to start up if any of these components does not function properly. Such a safety chain is prescribed by several standard regulations as e.g. EN81-1. Different safety-related functions, e.g. the landing door and car door closing function, overspeed protection functions etc. or control safety functions are provided with a corresponding safety switch arrangement of different safety functions. The execution of the safety functions and the state of all switches or switch arrangements is monitored by the monitoring system of the second assembly.

Due to the increased degree of integration of the whole assembly, just only several components of the control system are still left outside the shaft. In comparison to a normal elevator controller, most components are now relocated from outside to inside of the elevator shaft. Through this way, some advantages like less wiring, less complex and cable routing work during installation can be achieved. That brings further a clear economic advantage for installation so that the installation costs can be saved and the installation work will be faster finished.

As an improvement of the present invention, the first assembly of the control system is suitable for integration in a case. Then the entire case containing the first assembly is mountable as a controller cabinet on a wall and adjacent to a shaft/landing door of the elevator. The case can be placed on or in a frame of the landing door instead of on the wall to save more space. The architects would appreciate such a small controller cabinet which has absolutely no requirement for area and space. On the other hand, the components of the second assembly may also be put together into another case or distributed to suitable places over the total shaft. These cases shall be opened e.g. with a key which is only available for service, in order to prevent inadvertent operation with this control system.

The second assembly can be positioned beside or adjacent to the drive motor. As the controller cabinet outside of the shaft now contains only a part of the control system, the weight and dimension of the controller cabinet is reduced in comparison to a normal one. Such a controller cabinet has a compact and robust construction which provides besides an improved vandalism protection also a good aesthetic appearance and a high performance, since the small case can be easier integrated in different positions in the frame of a landing door or on the wall of a floor. It is also convenient for a maintenance personnel that she/he can close the cabinet more easily after work since the cabinet door is much smaller.

As an improvement of the present invention, the communication unit comprises a fixed user interface, e.g. an inspection operation panel or a LOP (Landing Operation Panel). Alternatively or additionally, the communication unit is capable of communicating with a mobile user interface, e.g. a mobile device like telephone or smartphone. The LOP can be mounted e.g. on the front site of the case. Passengers who will travel by the elevator may call at first an elevator car at a floor and then request a target floor by using a COP (Car Operation Panel) inside the car. Using a call entry terminal (e.g. Schindler: Port Technology, Schindler Elevator Corporation, Morristown, NJ), a request of a target floor will be automatically given at the same time as passengers call an elevator car on a floor. Moreover, the communication unit is capable of a wired or wireless communication.

As a further improvement of the present invention, the power supply system comprises at least an electric energy storage unit, e.g. a battery unit, a battery system or an uninterruptible power supply (UPS). The power supply may consist of more than one power supply unit so that they will supply power separately not only for the drive motor and the safety chain, but also for other electric or electronic function components of the elevator.

As another improvement of the present invention, the first assembly comprises further an emergency evacuation equipment for emergency cases and for test and/or inspection operations with the elevator. To meet customers varying needs, such an equipment has different variants, e.g. chair, stretcher, ladder or other necessary rescue equipment, devices and packages. These allow staff to store all relevant information and safety evacuation equipment.

According to a preferred embodiment of the present invention, the bypass device (also called as bridge device) of the first assembly is to bypass a door contact of a shaft door or a car door of the elevator. For maintenance of contacts of these doors, the bypass device shall be used to bridge the individual contact circuits of doors. It can be provided in the form of a cam switch in the controller cabinet.

According to another preferred embodiment, the drive control unit comprises a variable-frequency drive (VFD) unit. A variable frequency drive is a type of motor controller that drives an electric motor by varying the frequency and voltage of its power supply to adjust motor speed. It is possible that the motor and this drive control unit are integrated into a same housing, then the whole cost of the entire drive system will be significantly reduced.

According to a further preferred embodiment, the safety unit is for protection against an electrical injury or an electrical shock occurring in the control system. An electrical shock could be received when an electrical current passes through a human body or an electric circuit. The safety unit, e.g. a fuse or a circuit breaker, will provide an overcurrent protection and automatically disconnects the human and the electrical circuit from the electric power at the moment more current is drawn than its design allows.

To perform a maintenance or inspection operation, a service personnel usually needs to work in the shaft. According to the standard regulation EN81-20 there are two inspection control devices on the roof of the car and in the shaft pit respectively. For this reason, for instance, the first assembly shall be capable of a communication with a first inspection control device in a shaft pit, while the second assembly is to communicate with a second inspection control device on the roof of the car. Furthermore, the first assembly and the second assembly are also capable of communicating with a communication interface respectively which doesn't belong to the control system. This communication interface, e.g. a gateway, router or mobile device, is responsible for a communication of the elevator with an outside media or network. For example, a service personnel may also use a smartphone to control the elevator.

As an improvement of the present invention, an elevator comprising comprises a control system according to an above-mentioned control system.

As a further improvement of the present invention, an elevator group consists of more than one elevator according to an aforementioned elevator, wherein the elevators and/or their control systems are combined by a communication interface (e.g. gateway, router) with each other and/or gain an access to a network (e.g. public network) outside of this elevator group. The first and the second assemblies in an elevator of the elevator group are connected respectively as a segment of a safety chain of this elevator, and at least one elevator comprises a switch arrangement for switching the control system of this elevator to be available for controlling another elevator of this elevator group.

At least one of the afore-mentioned implementation examples offers one or more solutions to the problems and disadvantages of the known prior art. Other technological benefits of the present invention become evident to a person skilled in the art from the following description. The numerous examples of implementing the present invention achieve only a part of the presented advantages. None of the advantages is critical to the examples of implementation. Any required embodiment can technically be combined with any other required embodiment. The examples represent only a few advantageous embodiments and they do not limit the idea of the invention that can be implemented even in other manners within the framework of the description presented further below.

DESCRIPTION OF THE DRAWINGS

Below embodiments of the present invention are described in more detail with reference to the attached drawings. The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
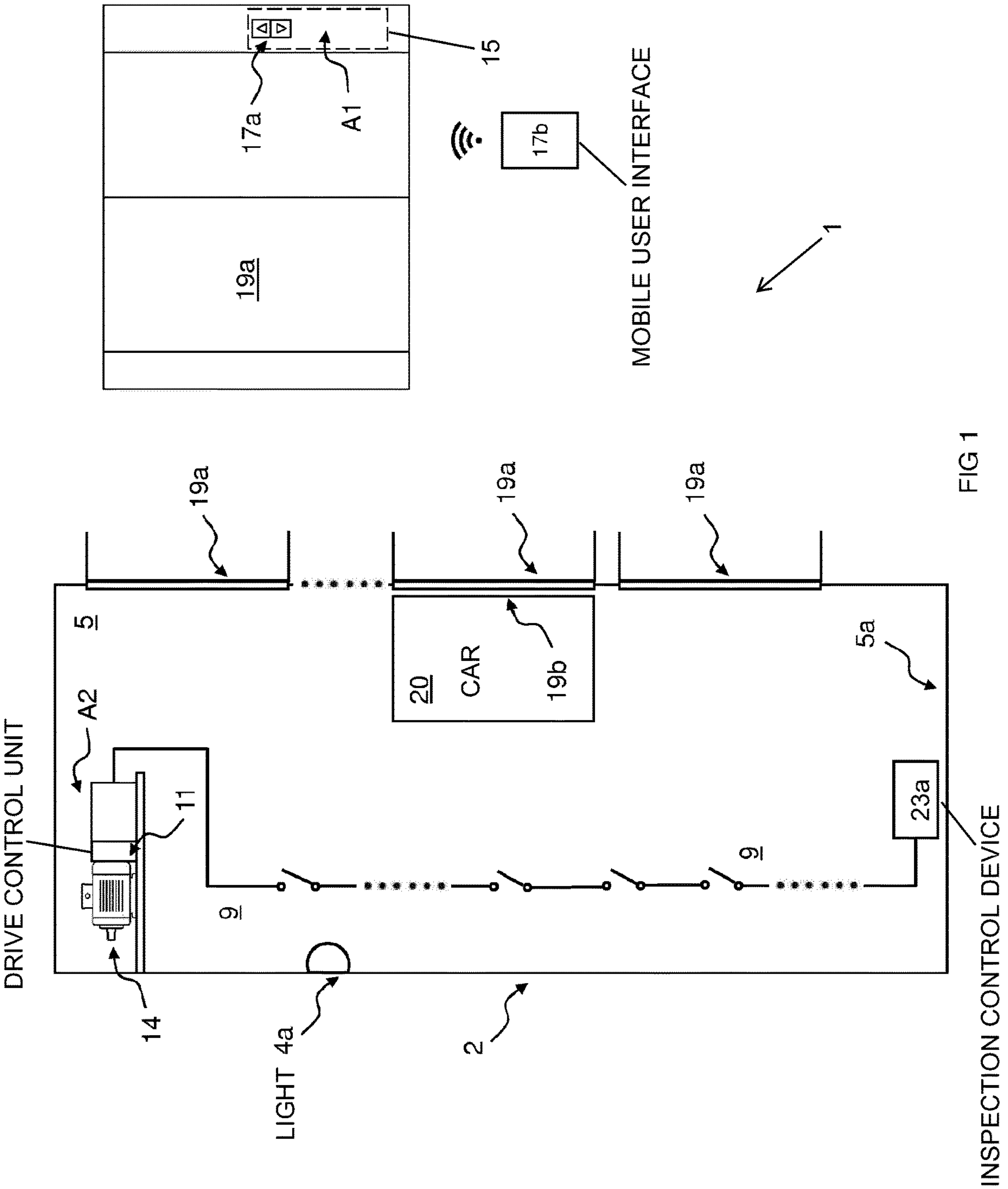
FIG. 1 shows a schematic view of one example of a control system according to aforementioned invention.

FIG. 1 is a schematic view of one example of a control system 1 disclosed herein for a MRL-elevator 2. This elevator 2 comprises a plurality of landing door/shaft door 19*a* and a car door 19*b* of an elevator car 20. In the upper right corner of FIG. 1 there is a front view of a closed landing door 19*a*. This control system 1 comprises a first assembly A1 and a second assembly A2. The first assembly A1 is integrated in a case or box 15 mounted outside of an elevator shaft 5 while the second assembly A2 is inside of the shaft 5 and adjacent to a drive motor 14. For this embodiment, the case 15 is integrated in a frame of the landing door 19*a* so that the outline of the case 15 is shown in dotted lines in the FIG. 1. The first assembly A1 and the second assembly can be communicated with each other wired or wirelessly. A safety chain 9 of this elevator 2 is expressed with a plurality of switches combined in series.

Figure 2:
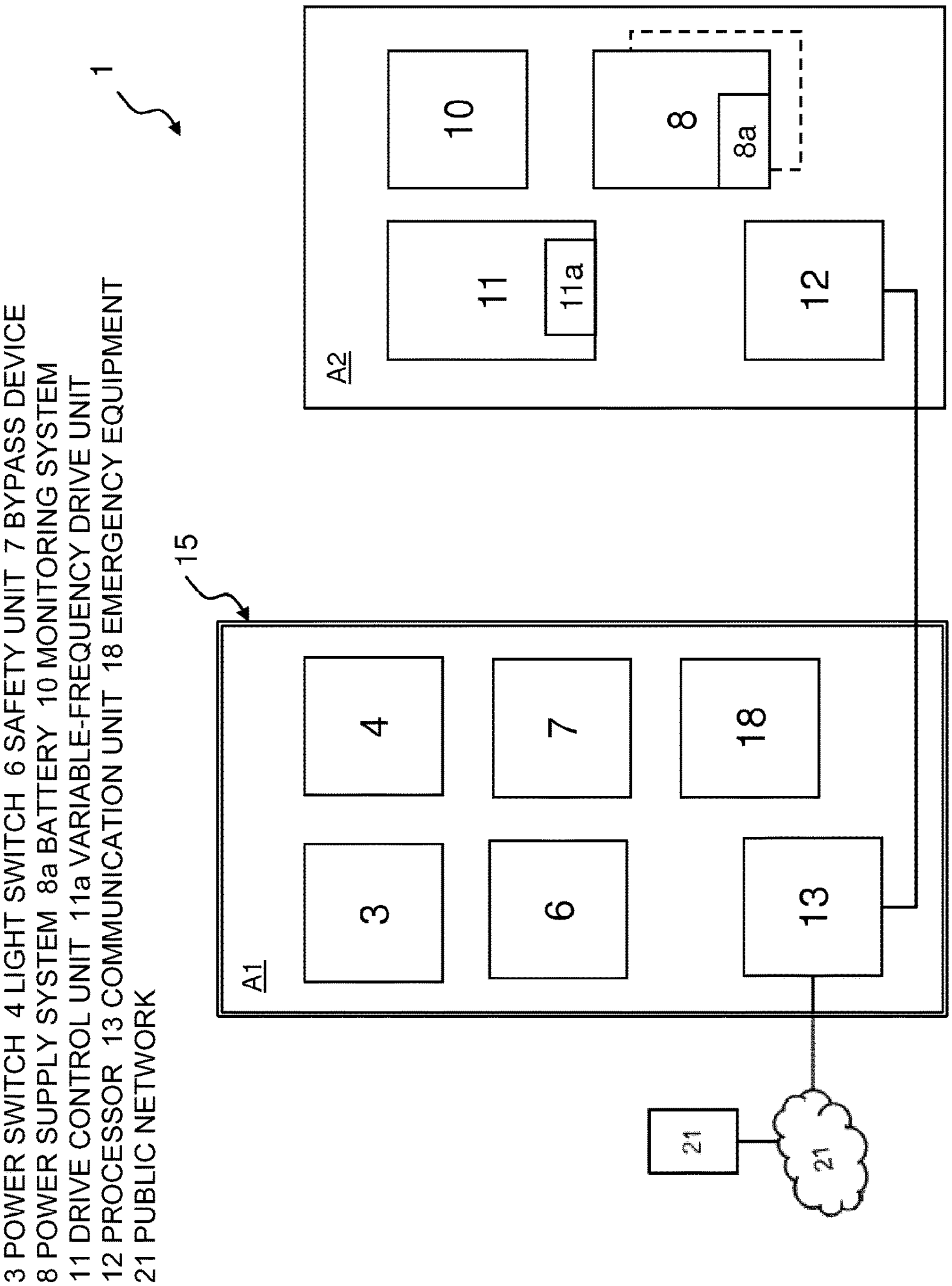
FIG. 2 shows a schematic view of two separate assemblies of one control system.

As shown in FIG. 2, within the first assembly A1 there are a power switch 3 for turning on or off the control system 1 and a light switch 4 for switching an electric light or lantern 4*a* in the shaft 5 (see FIG. 1). The electric light means a device that produces visible light from electric current. This light 4*a* can be an emergency light inside or outside of the elevator car 20. The first assembly A1 comprises further a safety unit 6 e.g. protecting against an electrical shock occurring in the control system 1, a communication unit 13 and a bypass device 7 for regulating the safety chain 9. The communication unit 13 may comprise a LOP as a fixed user interface 17*a* (see FIG. 1). As shown in FIG. 1, the LOP 17*a* is mounted outside on the case 15. The communication unit 13 is also able to communicate with a mobile user interface 17*b* (see FIG. 1), e.g. smart phone which is then used as a LOP or a COP (car operation panel).

An emergency evacuation equipment 18, e.g. chair, stretcher, ladder or other necessary rescue tools, is placed into the case 15 as a part of the first assembly A1. This equipment is for using in emergency cases or service procedures for the elevator 2.

The second assembly A2 comprises at least one power supply system 8, a monitoring system 10 for the safety chain 9, a drive control unit 11 with a variable-frequency drive (VFD) unit 11*a*, and a processor 12 being capable of data processing. The drive control unit 11 provides power to the motor 14 and controls this motor 14 to achieve a desired car movement. And the processor 12 can communicate with the communication unit 13 and process the data transferred to it. Furthermore, the power supply system 8 comprises a battery 8*a* to store electric energy. The power supply system 8 is able to supply energy to the motor 14, the safety chain 9 and also to other electric or electronic components of the elevator 2 at the same time.

Figure 3:
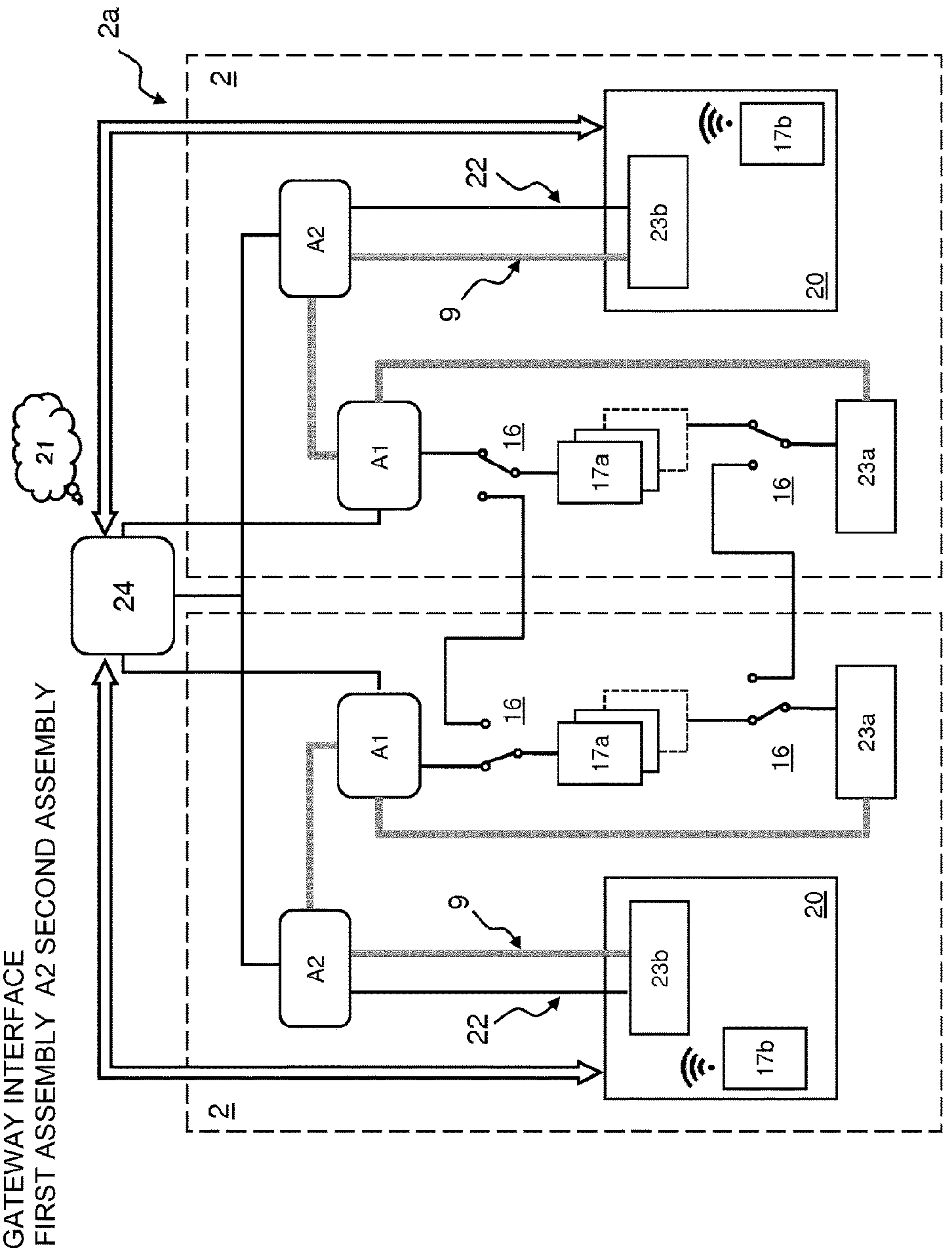
FIG. 3 shows a schematic illustration of one example of the functional arrangement of the control system for an elevator group.

FIG. 3 shows a schematic illustration of one example of the functional arrangement of the control system 1 for an elevator group 2*a*. Every elevator 2 of this elevator group 2*a* has an own control system 1, wherein the elevators 2 are combined by a gateway interface 24 to build a network (e.g. LAN: Local Area Network) and/or to gain an access to a public network 21 (e.g. internet or cloud). Communication paths between the elevators 2, and especially between the elevator car 20 and the gateway interface 24 are illustrated by double solid lines with arrows. Both the first assembly A1 and the second assembly A2 of one control system 1 can communicate with the gateway interface 24 and other control devices of the elevator 2 by connecting in a computer architecture, e.g. bus system 22, expressed in solid lines. The other control devices are e.g. inspection control devices 23*a*, 23*b* or user interfaces (COP or LOP) 17*a* and 17*b*.

With this gateway interface 24, relevant data of the elevators 2 like door movement or lifecycle utilization are collected, pre-analyzed, and transmitted to a Cloud-Platform. Moreover, this interface may work with Apps (Application software), streamed multimedia content, and even handles emergency voice calls. Such an interface supports as well mobile connectivity standards like 4G/LTE, 5G and VoIP functionality.

The first assembly A1 and the second assembly A2 build respective segments of the safety chain 9—expressed in stippled lines—within an elevator 2. For this embodiment, parallel to the electric connection with the safety chain 9, by using the bus system 22 the first assembly A1 is connected to one or more user interfaces 17*a* and an inspection control device 23*a* in a shaft pit 5*a*, while the second assembly A2 is connected to an inspection control device 23*b* at the car 20. The user interface, e.g. a fixed LOP 17*a* or a mobile device 17*b*, are suitable for wired or wireless communication. In the bus system 22 there is a switch arrangement 16 (e.g. one or more relays) to switch the first assembly A1 connecting in the bus system 22 within this elevator 2 or in another bus system 22 of another elevator. The special advantage of such a switching possibility is that a maintenance working for this elevator group 2*a* may be very convenient and practical, since during shutting-off of one control system 1 another one can be used temporally for more than one elevator 2 at the same time, including for the elevator 2 comprising this shut-off control system 1.

It is obvious to a person skilled in the art that with the advancement of technology, the basic idea of the invention may be implemented in various ways. The invention and its embodiments are thus not limited to the examples described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A control system for an elevator, the control system comprising:

a first assembly allocated outside a shaft of the elevator and a second assembly allocated inside the shaft;

wherein the first assembly includes a power switch for turning on or off the control system, a light switch for switching a light located in the shaft, a safety unit for protecting an electrical safety of the control system, a communication unit for communicating data with at least one of the elevator and an external communication means, and a bypass device for bypassing a safety chain of the elevator;

wherein the second assembly includes a power supply system for providing power to at least one of the elevator and the safety chain, a monitoring system for monitoring the safety chain, a drive control unit for controlling a drive motor of the elevator, and a processor for processing data of the control system; and wherein the first assembly and the second assembly are adapted to communicate with each other and to connect as segments into the safety chain.

2. The control system according to claim 1 wherein the first assembly is integrated into a case that is adapted to be mounted on a floor wall, adjacent to a shaft door of the elevator or in a frame of the shaft door.

3. The control system according to claim 1 wherein the second assembly is adapted to be positioned beside or adjacent to the drive motor.

4. The control system according to claim 1 wherein the communication unit at least one of includes a fixed user interface and is adapted to communicate with a mobile user interface.

5. The control system according to claim 4 wherein the fixed user interface is a landing operation panel of the elevator.

6. The control system according to claim 1 wherein the power supply system includes an electric energy storage unit.

7. The control system according to claim 1 wherein the first assembly includes an emergency evacuation equipment adapted for at least one of emergency, test and inspection operations with the elevator.

8. The control system according to claim 1 wherein the bypass device is adapted to bypass a door contact of a shaft door or a car door of the elevator.

9. The control system according to claim 1 wherein the drive control unit is a variable-frequency drive unit.

10. The control system according to claim 1 wherein the safety unit protects against an electrical injury or an electrical shock occurring in the control system.

11. The control system according to claim 1 wherein the communication unit is adapted for wired or wireless communication with a communication interface that does not belong to the control system.

12. The control system according to claim 1 wherein the first assembly communicates with an inspection control device in a shaft pit of the elevator.

13. The control system according to claim 1 wherein the second assembly communicates with an inspection control device at a car of the elevator.

14. An elevator comprising:

the control system according to claim 1; and an elevator shaft, the first assembly being positioned in the shaft and the second assembly being positioned outside the shaft.

15. An elevator group comprising:

at least two elevators, each of the elevators including the control system according to claim 1 and an elevator shaft, the first assembly being positioned in the shaft and the second assembly being positioned outside the shaft;

a communication device that at least one of combines the at least two elevators and gains an access to a network outside of the elevator group;

the first assembly and the second assembly in each of the at least two elevators are connected as segments of the safety chain in the elevator; and at least one of the at least two elevators includes a switch arrangement adapted to switch the control system of the at least one elevator to be available for controlling another of the at least two elevators.

16. An elevator group comprising:

at least two elevators, each of the elevators including the control system according to claim 1 and an elevator shaft, the first assembly being positioned in the shaft and the second assembly being positioned outside the shaft;

a communication device that at least one of combines the control systems of the at least two elevators and gains an access to a network outside of the elevator group;

the first assembly and the second assembly in each of the at least two elevators are connected as segments of the safety chain in the elevator; and at least one of the at least two elevators includes a switch arrangement adapted to switch the control system of the at least one elevator to be available for controlling another of the at least two elevators.

* * * * *